United States Patent
Oya (10) Patent No.: US 10,718,349 B2
(45) Date of Patent: Jul. 21, 2020

(54) FAN, AND ROTATIONAL SPEED DETECTION METHOD

(71) Applicant: DENSO CORPORATION, Kariya, Aichi-pref. (JP)

(72) Inventor: Hideki Oya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 141 days.

(21) Appl. No.: 16/064,512

(22) PCT Filed: Sep. 23, 2016

(86) PCT No.: PCT/JP2016/078025
§ 371 (c)(1),
(2) Date: Jun. 21, 2018

(87) PCT Pub. No.: WO2017/110183
PCT Pub. Date: Jun. 29, 2017

(65) Prior Publication Data
US 2018/0372114 A1    Dec. 27, 2018

(30) Foreign Application Priority Data

Dec. 25, 2015    (JP) ................. 2015-254733

(51) Int. Cl.
*F04D 27/00*    (2006.01)
*F04D 29/32*    (2006.01)
(Continued)

(52) U.S. Cl.
CPC ......... *F04D 29/329* (2013.01); *F04D 19/002* (2013.01); *F04D 27/001* (2013.01);
(Continued)

(58) Field of Classification Search
CPC ...... G01P 3/40; F04D 27/001; F04D 25/0613; G06F 1/206
See application file for complete search history.

(56) References Cited

U.S. PATENT DOCUMENTS 4,644,157 A * 2/1987 Ozawa ................. G01D 5/2451
250/231.14
5,061,859 A * 10/1991 Lovelace .............. H01L 31/167
250/551
(Continued)

FOREIGN PATENT DOCUMENTS

CN    102135545 A      7/2011
CN    103133411 A *    6/2013
(Continued)

OTHER PUBLICATIONS

Mao (CN 103133411A) Machine Translation (Year: 2012).*

*Primary Examiner* — Woody A Lee, Jr.
*Assistant Examiner* — Brian Christopher Delrue
(74) *Attorney, Agent, or Firm* — Harness, Dickey & Pierce, P.L.C.

(57) ABSTRACT

A fan is configured to generate an air flow by rotating together with a rotation shaft. The fan includes multiple blades arranged radially about a central axis of the rotation shaft and a boss portion that connects the blades to the rotation shaft. The boss portion has an end face portion located on one end side of the rotation shaft. The end face portion has an annular region concentric with the central axis of the rotation shaft. One part of the annular region in a circumferential direction has an optical refractive index different from an optical refractive index of another part of the annular region in the circumferential direction.

9 Claims, 7 Drawing Sheets

(51) Int. Cl.
*G01P 3/486* (2006.01)
*F04D 19/00* (2006.01)

(52) U.S. Cl.
CPC ........ *G01P 3/486* (2013.01); *F05B 2270/327* (2013.01); *F05B 2270/804* (2013.01); *F05D 2270/804* (2013.01)

(56) References Cited

U.S. PATENT DOCUMENTS

| | | | | |
|---|---|---|---|---|
| 5,399,070 A | * | 3/1995 | Alizaden | F04D 29/329 416/189 |
| 5,871,335 A | * | 2/1999 | Bartlett | F04D 29/263 416/244 R |
| 6,196,802 B1 | * | 3/2001 | Matsumoto | F04D 25/0613 415/216.1 |
| 6,313,460 B1 | * | 11/2001 | Haas | G01D 5/34715 250/231.13 |
| 6,394,767 B1 | * | 5/2002 | Matsumoto | F04D 25/08 310/71 |
| 6,577,117 B2 | * | 6/2003 | Kim | F04D 27/00 324/175 |
| 6,926,498 B2 | * | 8/2005 | Li | F04D 29/329 310/156.26 |
| 7,052,254 B2 | * | 5/2006 | Lin | F04D 29/063 384/107 |
| 7,112,906 B2 | * | 9/2006 | Chou | H02K 1/2786 310/156.12 |
| 7,183,939 B1 | * | 2/2007 | Lo | G09F 13/04 340/815.53 |
| 7,909,586 B2 | * | 3/2011 | Yu | F04D 29/329 416/204 R |
| 8,137,079 B2 | * | 3/2012 | Yamazaki | F04D 25/0613 417/354 |
| 8,579,609 B2 | * | 11/2013 | Lee | F04D 25/0606 310/156.12 |
| 8,690,552 B2 | * | 4/2014 | Chang | F04D 17/16 415/205 |
| 9,118,267 B2 | * | 8/2015 | Zhou | H02P 7/29 |
| 9,492,970 B2 | * | 11/2016 | Karvinen | B29C 70/025 |
| 10,150,360 B2 | * | 12/2018 | Ohno | B60K 11/06 |
| 2002/0003704 A1 | * | 1/2002 | Ohmae | F21S 10/007 362/293 |
| 2002/0047384 A1 | * | 4/2002 | Matsumoto | F04D 25/0613 310/89 |
| 2007/0024841 A1 | * | 2/2007 | Kloza | G01S 7/4811 356/5.03 |
| 2011/0179865 A1 | | 7/2011 | Chen et al. | |
| 2012/0091832 A1 | * | 4/2012 | Soderberg | C08J 3/00 310/44 |
| 2013/0162975 A1 | * | 6/2013 | Gao | F04D 25/0613 356/28 |
| 2014/0184126 A1 | * | 7/2014 | Zhou | H02P 7/29 318/503 |
| 2016/0010649 A1 | * | 1/2016 | Aiello | F04D 25/0613 417/423.7 |
| 2018/0065472 A1 | * | 3/2018 | Ohno | B60K 11/06 |
| 2019/0170158 A1 | * | 6/2019 | Azzouz | F01P 1/06 |
| 2019/0195076 A1 | * | 6/2019 | Polo Filisan | B64C 11/30 |

FOREIGN PATENT DOCUMENTS

| | | | |
|---|---|---|---|
| CN | 103185807 A | | 7/2013 |
| JP | 2011145251 A | | 7/2011 |
| JP | 2018035675 A | * | 3/2018 |

\* cited by examiner

FAN, AND ROTATIONAL SPEED DETECTION METHOD

CROSS-REFERENCE TO RELATED APPLICATIONS

This application is a U.S. National Phase Application under 35 U.S.C. 371 of International Application No. PCT/JP2016/078025 filed on Sep. 23, 2016 and published in Japanese as WO 2017/110183 A1 on Jun. 29, 2017. This application is based on and claims the benefit of priority from Japanese Patent Application No. 2015-254733 filed on Dec. 25, 2015. The entire disclosures of all of the above applications are incorporated herein by reference.

TECHNICAL FIELD

The present disclosure relates to a fan and a method of detecting a rotational speed of the fan.

BACKGROUND ART

Conventionally, a rotational speed of a fan that is a rotating piece of a blower is detected so as to measure characteristics of the blower. For example, Patent Literature 1 discloses a configuration in which a sensor such as a condenser microphone is disposed to face blades of a fan, and the rotational speed of the fan is detected based on the output value of the sensor and the number of blades.

PRIOR ART LITERATURES

Patent Literature

JP 2011-145251 A

SUMMARY OF THE INVENTION

However, in Patent Literature 1, the rotational speed of the fan is detected with reference to blades which are susceptible to vibrations during rotation, and it is difficult to appropriately detect the rotational speed due to vibrations of the blades, for example.

It is an objective of the present disclosure to provide a fan whose rotational speed can be detected accurately, and a method of detecting the rotational speed of the fan.

According to an aspect of the present disclosure, a fan configured to generate an air flow by rotating together with a rotation shaft includes multiple blades arranged radially about a central axis of the rotation shaft and a boss portion that connects the blades to the rotation shaft.

The boss portion has an end face portion located on one end side of the rotation shaft. The end face portion has an annular region concentric with the central axis of the rotation shaft. One part of the annular region in a circumferential direction has a refractive index different from a refractive index of another part of the annular region in the circumferential direction.

In this way, when the one part of the end face portion of the boss portion is configured to be different in the refractive index of light than the another part, the rotational speed of the fan can be detected by utilizing a change of the reflected light when the end face portion of the boss portion is irradiated with light, for example. In particular, since the boss portion is connected to the rotation shaft, the boss portion stably rotates as compared with the blade. Therefore, by detecting the rotational speed of the fan with reference to the boss portion, the rotational speed can be appropriately detected.

According to another aspect of the present disclosure, a method is for detecting a rotational speed of a fan that includes multiple blades arranged radially about a central axis of a rotation shaft and a boss portion connecting the blades to the rotation shaft.

In the rotational speed detection method, an annular region of the end face portion of the boss portion concentric with the central axis of the rotation shaft is configured such that one part of the annular region in a circumferential direction has a refractive index different from a refractive index of another part of the annular region in the circumferential direction. In the rotational speed detection method, a track of the one part rotating about the central axis of the rotation shaft is irradiated with light during rotation of the fan. The rotational speed of the fan is detected with reference to a change of reflectance of light reflected by the end face portion.

According to this, since the rotational speed of the fan is detected by utilizing the change of the reflected light when the boss portion that rotates stably compared to the blade is irradiated with light, the rotation speed of the fan can be appropriately detected.

EMBODIMENTS FOR CARRYING OUT INVENTION

Hereinafter, embodiments of the present disclosure will be described with reference to the drawings. In the following embodiments, parts, which are the same as or equivalent to those described in the preceding embodiments, will be indicated by the same reference signs, and the description thereof may be omitted.

Also, in the following embodiments, when only some of the constituent elements are described, corresponding constituent elements of a previously described one or more of the embodiments may be applied to the rest of the constituent elements.

The following embodiments may be partially combined with each other even if such a combination is not explicitly described as long as there is no disadvantage with respect to such a combination.

First Embodiment

Embodiments of the present disclosure will be described with reference to FIGS. 1 to 7. In the present embodiment, an example in which a blower 1 of the present disclosure is applied to an apparatus that supplies air to a radiator such as a vehicle-mounted radiator will be described.

Figure 1:
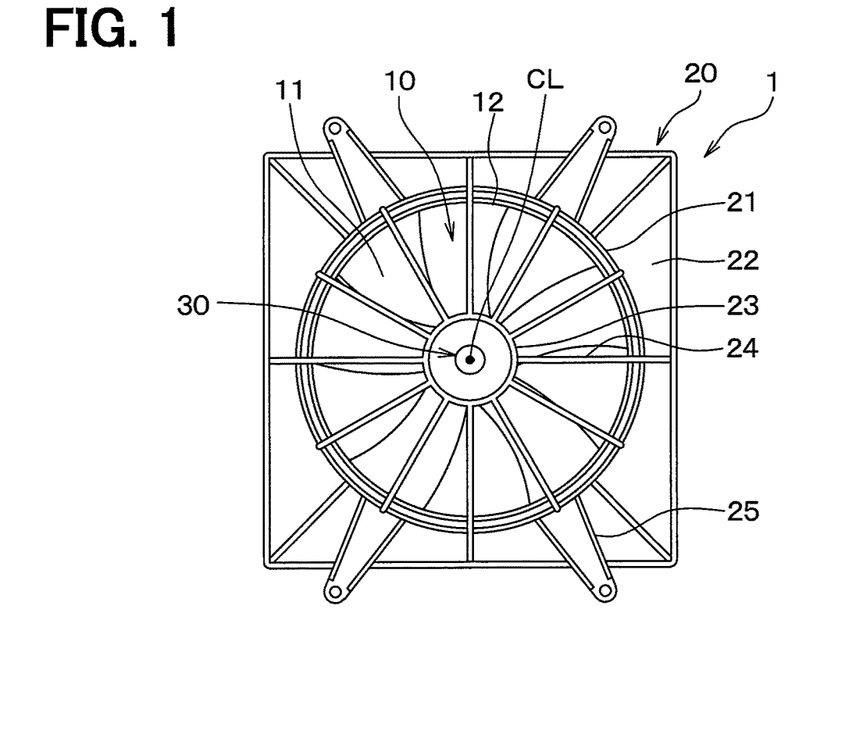
FIG. 1 is a schematic front view illustrating a blower according to a first embodiment.

As shown in FIG. 1, the blower 1 includes a fan 10, a shroud 20, and an electric motor (not shown). The blower 1 of the present embodiment is an axial flow type blower that blows air drawn from one end side of a rotation shaft 30 of the electric motor to the other end side of the rotation shaft 30 along a central axis CL.

The shroud 20 is a member constituting an outer shell of the blower 1. The outline of the shroud 20 is formed in a rectangular shape corresponding to the shape of a radiator that is not shown. The shroud 20 includes an intake opening portion 21 for drawing air to the fan 10, a wind guide portion 22 for collecting air to the intake opening portion 21, a motor holding portion 23 for holding the electric motor, a motor stay 24 connecting a motor holding portion 23 to the suction opening portion 21, and a mounting portion 25. The mounting portion 25 is a member for fixing the blower 1 to a structure of the vehicle, for example.

The fan 10 is coupled to one end side of the rotation shaft 30 and rotates together with the rotation shaft 30 to generate an air flow. The fan 10 of the present embodiment is an axial fan that generates an air flow along the central axial CL of the rotation shaft 30.

Figure 2:
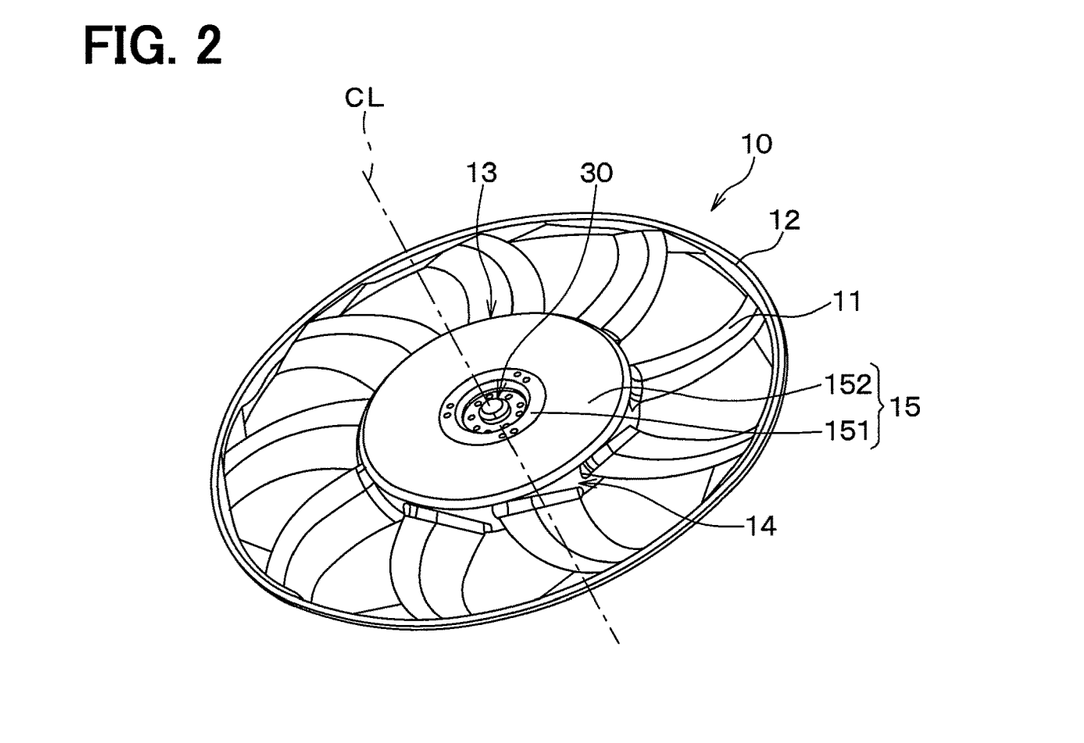
FIG. 2 is a perspective view illustrating a fan according to the first embodiment.

As shown in FIG. 2, the fan 10 includes multiple blades 11, an annular ring portion 12 to which outer peripheral end portions of the blades 11 are connected, and the boss portion 13 that connects the blades 11 to the rotation shaft 30.

The blades 11 are arranged radially about the central axis CL of the rotation shaft 30. The blades 11 are arranged around the rotation shaft 30 at a predetermined interval. The blades 11 of the present embodiment are swept blades. The blades 11 are not limited to the swept blades, and may be straight blades or forward swept blades.

The ring portion 12 is an annular member whose center is the central axis CL of the rotation shaft 30. The ring portion 12 constitutes an outermost peripheral portion of the fan 10. The outer end side of the blade 11 is connected to the inner peripheral side of the ring portion 12.

The boss portion 13 is a member constituting a central portion of the fan 10. The boss portion 13 is constituted by a bottomed cylindrical member. The boss portion 13 includes a cylinder portion 14 whose center is the central axis CL of the rotation shaft 30. The inner end side of the blade 11 is connected to the outer peripheral side of the cylinder portion 14.

Further, the boss portion 13 has an end face portion 15 constituting a bottom surface of the boss portion 13. The end face portion 15 is a disk member which extends in a direction intersecting the central axis CL of the rotary shaft 30, i.e. a direction perpendicular to the central axis CL. The end face portion 15 is located upstream of the cylindrical portion 14 with respect to the airflow. The end face portion 15 of the present embodiment is exposed to the outside so as to be visible from the outside.

Specifically, the end face portion 15 has a first end face portion 151 and second end face portion 152. The first end face portion 151 is made of metal and located at a portion to which the rotation shaft 30 is connected. The second end face portion 152 constitutes a part of the end face portion 15 located on an outside in the radial direction of the rotation shaft 30 with respect to the first end face portion 151.

Figure 3:
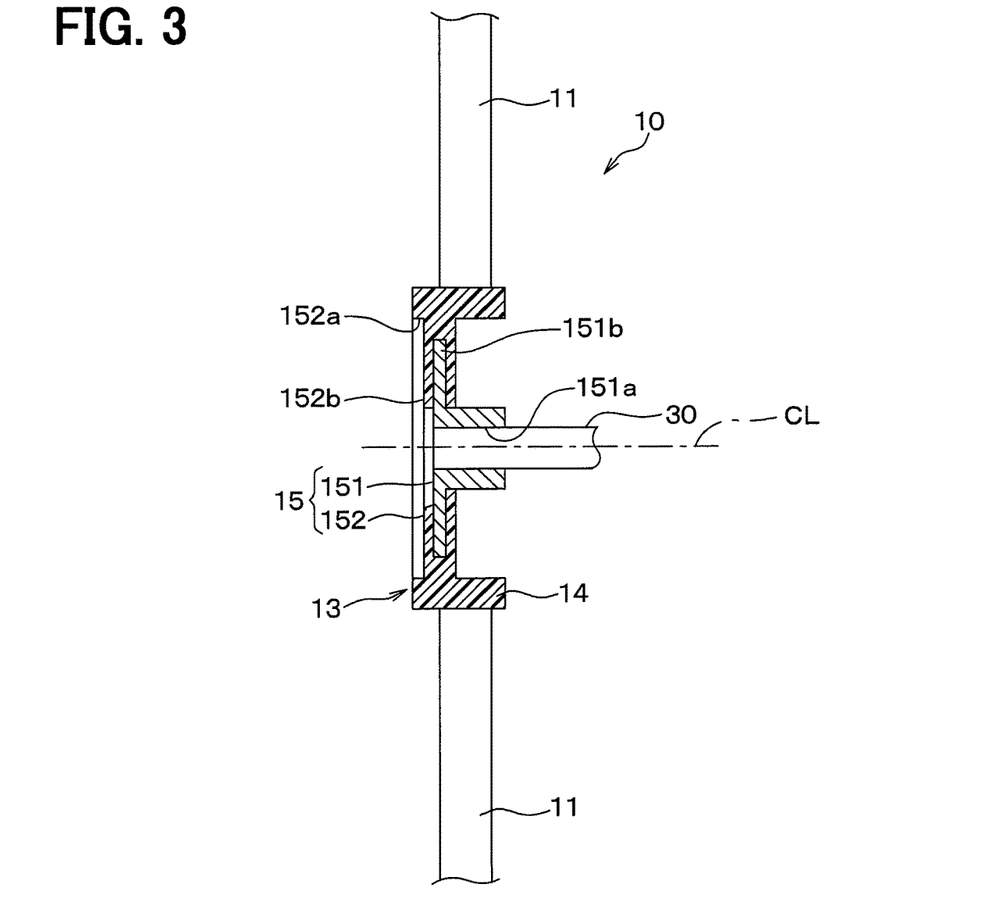
FIG. 3 is a schematic cross-sectional view illustrating the fan according to the first embodiment.

As shown in FIG. 3, in the first end face portion 151, a fitting hole 151a into which one end side of the rotating shaft 30 is inserted is formed in the center portion of the first end face portion 151. Further, the first end face portion 151 has a circular flange portion 151b extending outward in the radial direction of the rotary shaft 30. A radially inner portion of the flange portion 151b is exposed to the outside, and a radially outer portion of the flange portion 151b is covered with the second end face portion 152.

The second end face portion 152 is a member connecting the first end face portion 151 and the cylindrical portion 14. The second end face portion 152 covers a part of the first end face portion 151 and extends outward in the radial direction of the rotary shaft 30 to have a flange shape.

Figure 4:
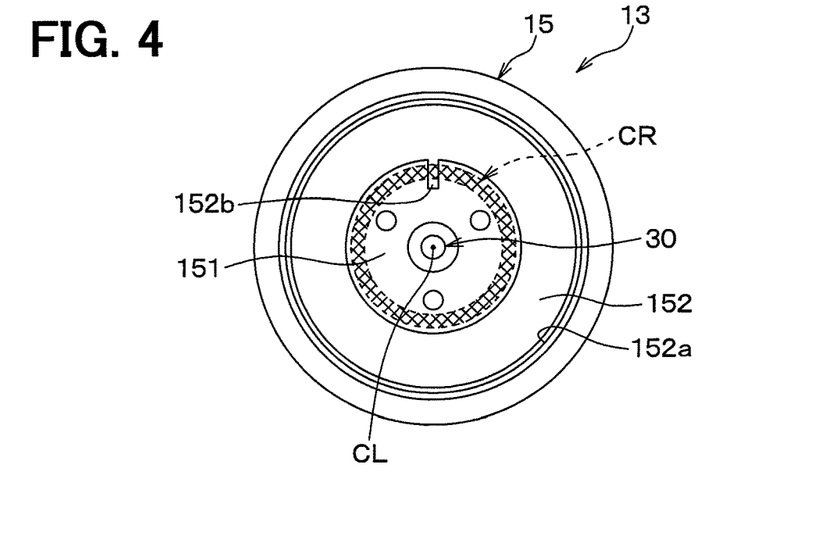
FIG. 4 is a front diagram illustrating a boss portion of the fan according to the first embodiment.

As shown in FIG. 4, an annular step portion 152a concentric with the central axis CL of the rotation shaft 30 is formed on the outer peripheral side of the second end face portion 152. Further, an extending portion 152b protruding toward the rotary shaft 30 is formed in a part of an inner peripheral edge portion of the second end face portion 152.

In the fan 10 of the present embodiment, the first end face portion 151 is made of metal such as stainless steel or brass. Further, in the fan 10 of the present embodiment, multiple blades 11, the ring portion 12, the cylindrical portion 14, and the second end face portion 152 are made of resin such as PA resin. Each member constituting the fan 10 is integrally formed by, for example, insert molding. That is, in the fan 10 of the present embodiment, the first end face portion 151 and the second end face portion 152 are integrally molded as a single member.

In the fan 10 of the present embodiment, the first end face portion 151 is made of metal having a refractive index of light different from that of the resin second end face portion 152. In other words, in the fan 10 of the present embodiment, the second end face portion 152 is made of resin having a refractive index of light different from that of the metal first end face portion 151.

Specifically, in the fan 10 of the present embodiment, the first end face portion 151 is made of a metal whose refractive index of light is lower than that of the resin second end face portion 152. Note that the first end face portion 151 may be made of metal whose refractive index of light is higher than that of the second end face portion 152 as long as the refractive index of the first end face portion 151 is different from that of the second end face portion 152 made of resin.

Here, in an annular region CR of the end face portion 15 of the present embodiment concentric with the central axis CL of the rotation shaft 30, one part in a circumferential direction has a refractive index different from that of the remaining parts in the circumferential direction other than the one part. The annular region CR is irradiated with light from a light source described later. The one part in the annular region in the circumferential direction is a region to which the light is intermittently irradiated from the light source described later when the rotation shaft 30 rotates. In FIG. 4, for convenience of explanation, mesh hatching is given to the annular region CR, but the mesh hatching is not attached to the actual end face part 15. This similarly applied to the drawings other than FIG. 4.

In the present embodiment, since the second end face portion 152 includes the extending portion 152b, a part of the second end face portion 152 made of resin is exposed to the outside in the one part in the annular region CR in the circumferential direction, and the first end face portion 151 made of metal is exposed in the remaining parts of the annular region CR. In the present embodiment, the one part in the annular region CR in the circumferential direction is a region in which a part of the second end face portion 152 is exposed to the outside. In the present embodiment, the remaining parts in the annular region CR in the circumferential direction are a region in which a part of the first end face portion 151 is exposed to the outside.

In the present embodiment, a part of the annular region CR in the circumferential direction in which the extending portion 152b is provided corresponds to a region in which the second end face portion 152 made of resin is exposed to the outside. In the present embodiment, the remaining parts of the annular region CR in the circumferential direction in which the extending portion 152b is not provided corresponds to a region in which the first end face portion 151 made of metal is exposed to the outside.

In the blower 1 configured as described above, when the fan 10 rotates with the rotation shaft 30, the air that has passed through the radiator is drawn toward the fan 10 from one end side of the rotation shaft 30, and the air is blown out from the fan 10 along the central axis CL of the rotation shaft 30.

Meanwhile, the rotational speed of the fan 10 of the blower 1 is sometimes detected in an inspection process after manufacturing the fan 10 so as to measure characteristics of the fan 10. In this case, it is conceivable to detect the rotational speed with reference to the blade 11.

However, the blade 11 is susceptible to vibrations during rotation. Therefore, when the rotational speed is detected with reference to the blade 11, it may be difficult to accurately detect the rotational speed of the fan 10 due to vibration of the blade 11 or the like.

Therefore, in the present embodiment, the rotational speed is detected with reference to the boss portion 13 of the fan 10. Hereinafter, a method of detecting the rotational speed of the fan 10 of the present embodiment will be described with reference to FIGS. 5 to 7.

First, a rotational speed detection device 50 for detecting the rotational speed of the fan 10 of the present embodiment will be described with reference to FIG. 5. The rotational speed detecting device 50 is an optical device that detects the rotational speed based on a change of reflectance of light irradiated from a light source.

Figure 5:
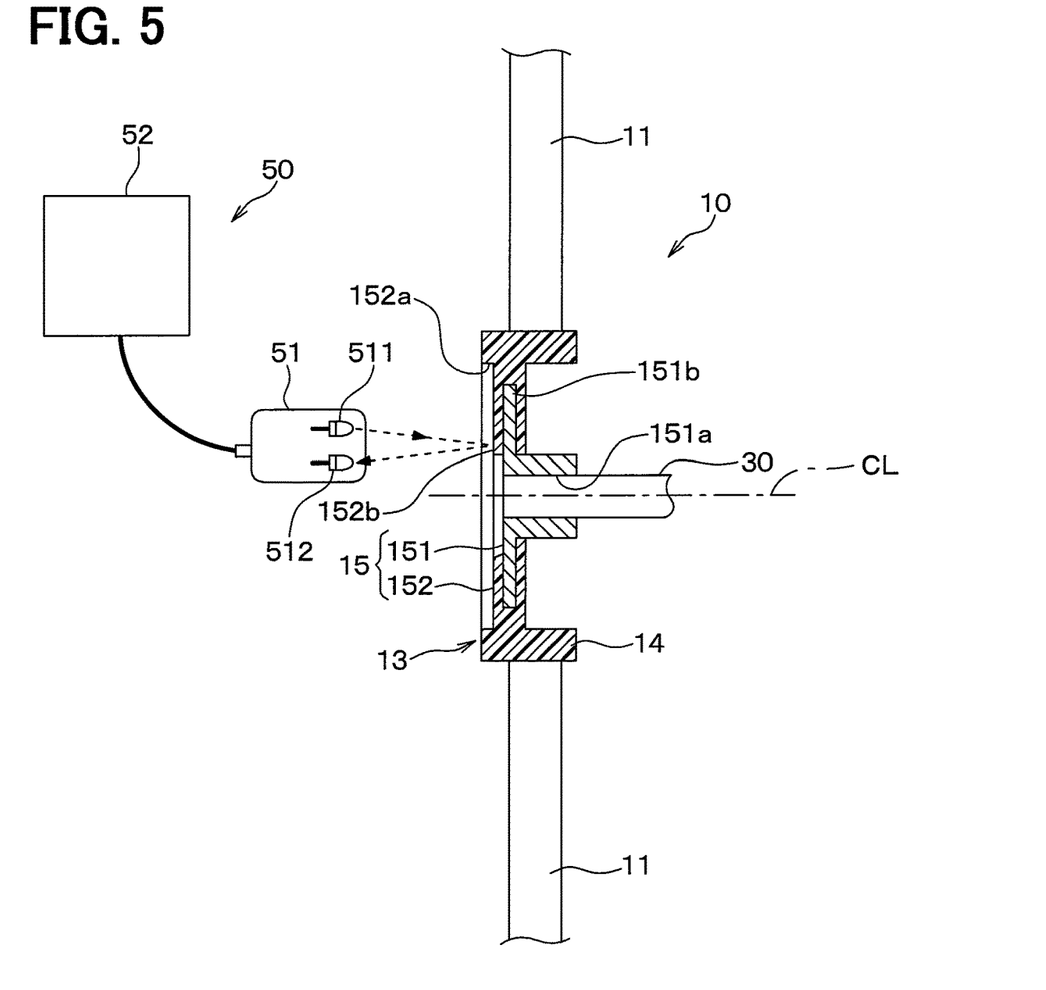
FIG. 5 is a schematic cross-sectional diagram illustrating the fan including a rotational speed detecting device according to the first embodiment.

As shown in FIG. 5, the rotational speed detection device 50 includes a photoelectric conversion unit 51, and a detection unit 52 that detects the rotational speed of the fan 10 based on the output signals from a light receiving element 512 of the photoelectric conversion unit 51 described later.

The photoelectric conversion unit 51 has a light emitting element 511 constituting a light source for emitting light to the end face portion 15 of the boss portion 13, and the light receiving element 512 constituting a light receiving portion for receiving reflected light from the end face portion 15 of the boss portion 13.

The light emitting element 511 is disposed so that light is irradiated onto the track of the extending portion 152b of the second end face portion 152 which revolves about the central axis of the rotating shaft 30 when the rotating shaft 30 is rotated. The light emitting element 511 may be constituted by a light emitting diode or a laser diode, for example.

The light receiving element 512 is disposed at a position where the reflected light of the light irradiated onto the end face portion 15 is incident when the rotary shaft 30 is rotated. The light receiving element 512 outputs a detection signal to the detection unit 52, and the detection signal changes in correlation with the reflectance of the light. The light receiving element 512 can be constituted by a photodiode or a phototransistor, for example.

The detection unit 52 is configured to detect the rotational speed of the fan 10 based on the detection signal from the light receiving element 512. For example, the detection unit 52 detects the rotational speed of the fan 10 based on the number of times the detection signal of the light receiving element 512 changes when the fan 10 is rotated a predetermined number of times, and the rotation time of the fan 10.

Figure 6:
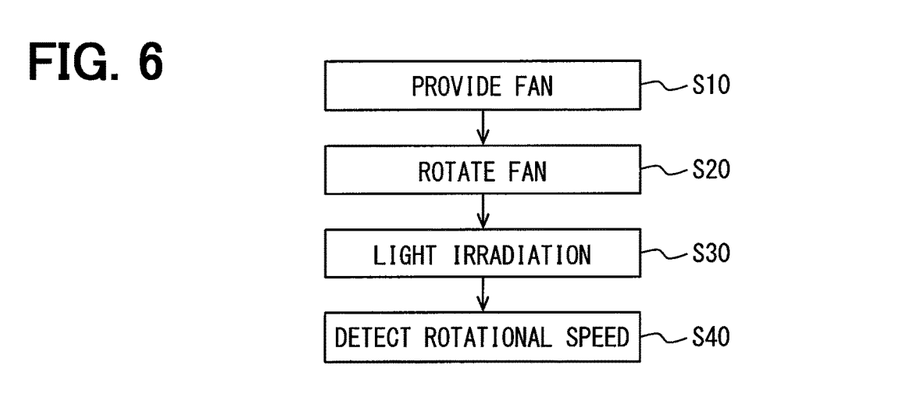
FIG. 6 is an explanatory diagram for explaining a flow of the rotational speed detection method according to the first embodiment.

Next, a method of detecting the rotational speed of the fan 10 of the present embodiment will be described with reference to FIG. 6. As shown in FIG. 6, in the first step S10, the fan 10 configured so that one part in the circumferential direction in the annular region CR of the end face portion 15 has a refractive index of light different from that of the other region is prepared.

In the next step S20, the fan 10 is joined to the rotating shaft 30 and rotated. At this time, the rotation shaft 30 connected to the fan 10 is not limited to the one attached to the electric motor of the blower 1, and one prepared for the test operation may be used as the rotational shaft 30.

In the next step S30, the end face portion 15 of the rotating fan 10 is irradiated with the light from the light emitting element 511. Specifically, in step S30, when the fan 10 is rotated, the track of the extending portion 152b, which is the one part that revolves about the central axis CL of the rotating shaft 30, is irradiated with light from the light emitting element 511.

At this time, the reflected light from the end face portion 15 is incident on the light receiving element 512. In the end face portion 15 of this embodiment, the extending portion 152b constituting the one part of the annular region CR has the refractive index lower than that of the remaining region of the annular region CR.

Figure 7:
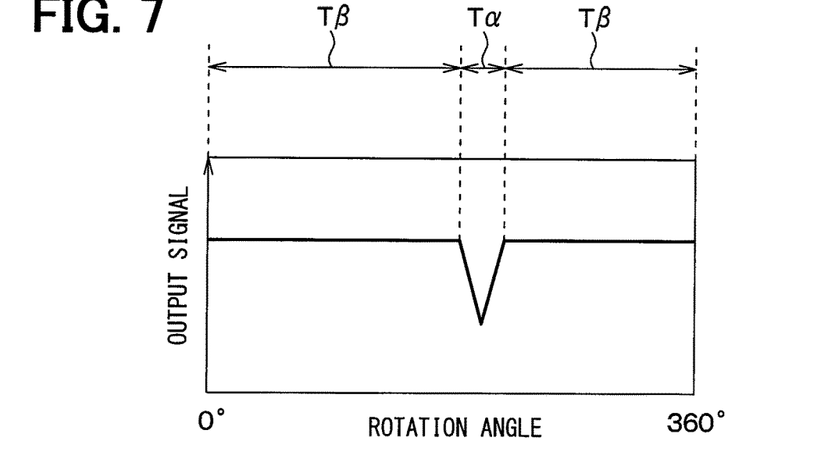
FIG. 7 is a graph showing a change of an output signal of a light receiving element when the fan of the first embodiment is rotated 360 degrees.

Therefore, when the fan 10 makes one revolution, the reflectance from the extending portion 152b is lower than the remaining parts. Therefore, as shown in FIG. 7, the output signal from the light receiving element 512 during the period Tα when the extending portion 152b is irradiated is lower than that during the period Tβ when the extending portion 152b is not irradiated.

As shown in FIG. 6, in step S40, the rotational speed of the fan 10 is detected based on the change in the detection signal of the light receiving element 512 that has received the reflected light from the end face portion 15, that is, based on the change in the reflectance of the light. Specifically, the detection unit 52 of the rotational speed detection device 50 detects the rotational speed of the fan 10 based on the number of times the detection signal of the light receiving element 512 changes when the fan 10 is rotated a predetermined number of times, and the rotation time of the fan 10.

In the end face portion 15 of the fan 10 of this embodiment described above, the one part of the annular region CR in a circumferential direction which is concentric with the central axis CL of the rotation axis 30 has a refractive index different from that of the remaining parts of the annular region CR in the circumferential direction.

In this way, since the one part of the end face portion 15 of the boss portion 13 is different in the refractive index of light than the remaining parts, the rotational speed of the fan 10 can be detected based on the change of the reflected light irradiated onto the end face portion 15 of the boss portion 13, for example.

In particular, since the boss portion 13 is connected to the rotation shaft 30, the boss portion 13 rotates stably as compared with the blade 11. Therefore, by detecting the rotational speed of the fan 10 with reference to the boss portion 13, the rotational speed can be appropriately detected.

In the present embodiment, the end face portion 15 has a first end face portion 151 and a second end face portion 152. The first end face portion 151 is made of metal and located in a portion to which the rotation shaft 30 is connected. The second end face portion 152 made of resin constitutes a part of the first end face portion 151 located on an outside in the radial direction of the rotation shaft 30. Further, in the present embodiment, the first end face portion 151 and the second end face portion 152 are integrally molded as a single member.

According to this, since the strength of the connecting portion of the boss portion 13 connected to the rotating shaft 30 can be secured, the rotation of the boss portion 13 can be sufficiently stabilized. This is advantageous for appropriately detecting the rotational speed of the fan 10.

Furthermore, in the present embodiment, the second end face portion 152 includes the extending portion 152b covering a part of the first end face portion 151. Accordingly, in the end face portion 15 of this embodiment, the second end face portion 152 is exposed to the outside in the one part of the annular region CR in the circumferential direction, and the first end face portion 151 is exposed to the outside in the remaining part of the annular region CR in the circumferential direction.

Since the constituent material of the one part in the annular region CR is different from the constituent material of the remaining part, the refractive index is different therebetween. Accordingly, the rotational speed of the fan 10 can be detected accurately without an additional dedicated member or the like for differentiating the refractive index of light.

Second Embodiment

Next, a second embodiment will be described with reference to FIGS. 8 and 9. This embodiment is different from the first embodiment in that the first end face portion 151 is exposed to the outside in the one part of the annular region CR of the end face portion 15 in the circumferential direction, and the second end face portion 152 is exposed to the outside in the remaining parts. The end face portion 15 of this embodiment does not have the extension portion 152b described in the first embodiment.

Figure 8:
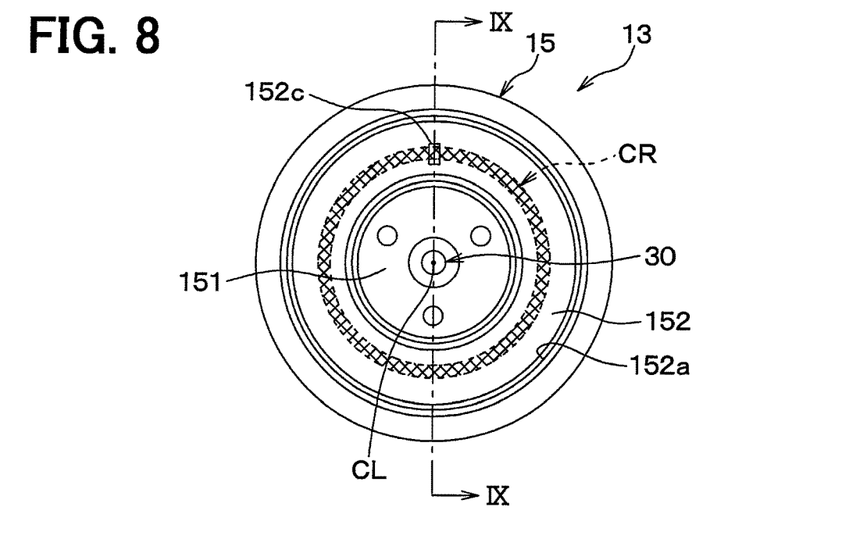
FIG. 8 is a front diagram illustrating a boss portion of a fan according to a second embodiment.
Figure 9:
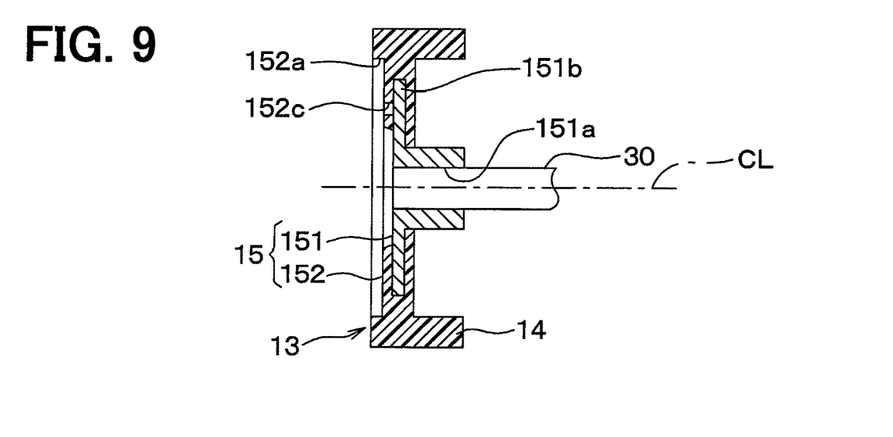
FIG. 9 is a cross-sectional view taken along line IX-IX of FIG. 7.

As shown in FIGS. 8 and 9, the second end face portion 152 of this embodiment has a slit 152c at a portion which overlaps the first end face portion 151 in a direction along the central axis CL of the rotation shaft 30. A part of the first end face portion 151 is exposed to the outside through the slit 152c. The slit 152c is formed in the second end face portion 152 and extends in the radial direction of the rotary shaft 30.

Further, in the present embodiment, the annular region CR is set in the region including the slit 152c of the end face portion 15. As a result, in the annular region CR, the one part in the circumferential direction is a region where the first end face portion 151 made of metal is exposed to the outside and the remaining parts are a region in which the second end face portion 152 made of resin is exposed to the outside. That is, in the present embodiment, a part of the annular region CR in the circumferential direction in which the slit 152c is provided is a region in which the first end face portion 151 made of metal is exposed to the outside. In the present embodiment, the remaining parts of the annular region CR in the circumferential direction in which the slit 152c is not provided are a region in which the second end face portion 152 made of resin is exposed to the outside.

The remaining structures are the same as the first embodiment. In the fan 10 of the present embodiment, the slit 152c for exposing a part of the first end face portion 151 to the outside is provided in the second end face portion 152. Accordingly, in the fan 10 of this embodiment, the first end face portion 151 is exposed to the outside in the one part of the annular region CR in the circumferential direction, and the second end face portion 152 is exposed to the outside in the remaining parts of the annular region in the circumferential direction.

Since the constituent material of the one part in the annular region CR is different from the constituent material of the remaining part, the refractive index is different therebetween. Accordingly, the rotational speed of the fan 10 can be detected accurately without an additional dedicated member or the like for differentiating the refractive index of light.

Third Embodiment

Next, a third embodiment will be described with reference to FIGS. 10 to 12. This embodiment is different from the first embodiment in that the refractive index of light in the circumferential direction of the annular region CR is varied by the shape of the end face part 15. The end face portion 15 of this embodiment does not have the extension portion 152b described in the first embodiment.

Figure 10:
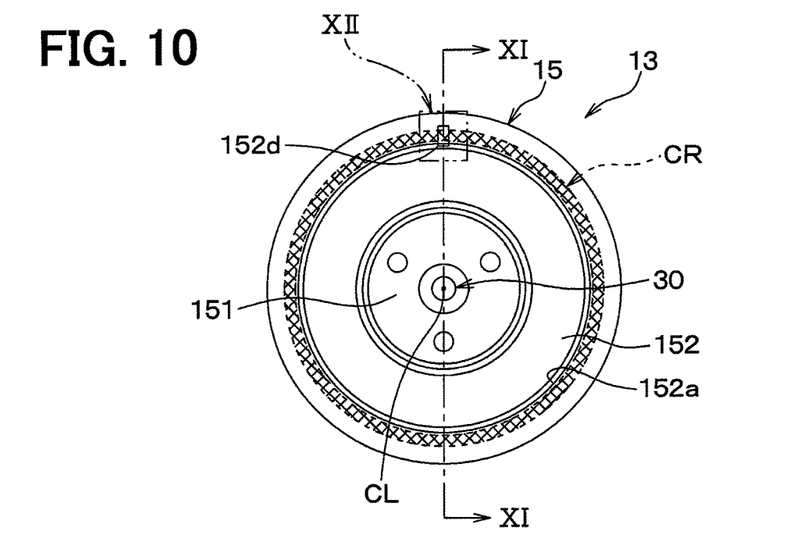
FIG. 10 is a front diagram illustrating a boss portion of a fan according to a third embodiment.
Figure 11:
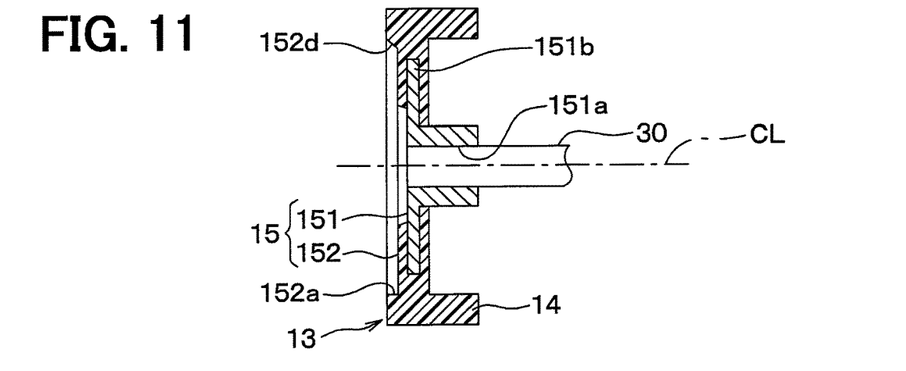
FIG. 11 is a cross-sectional view taken along line XI-XI of FIG. 10.
Figure 12:
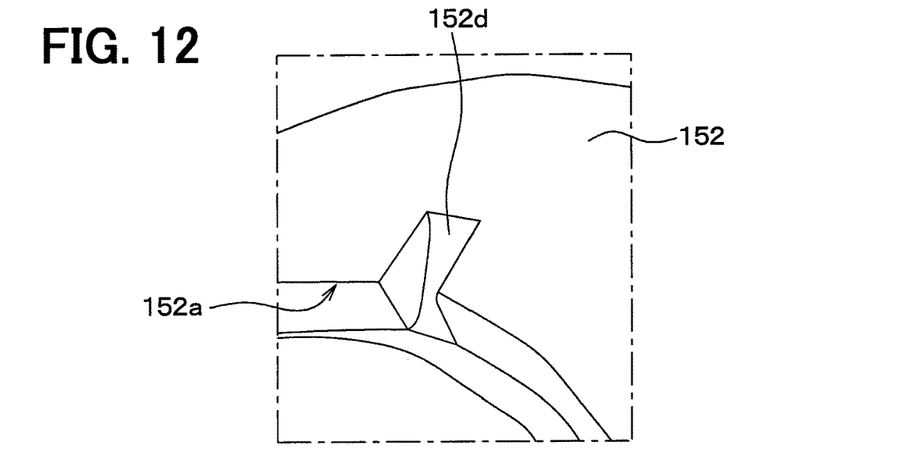
FIG. 12 is a perspective view illustrating the XII portion of FIG. 10.

As shown in FIG. 10, FIG. 11, and FIG. 12, in this embodiment, an inclined surface 152d is formed in a part of the step portion 152a located on the outer peripheral side of the second end face portion 152. The inclined surface 152a is inclined with respect to the other portion. Thereby, in the step portion 152a, the portion where the inclined surface 152d is formed and the other portion have different refractive indices of light.

Further, in the present embodiment, the annular region CR is set in the region including the step portion 152a of the end face portion 15. As a result, in the annular region CR, the reflectance of light in a region in the circumferential direction where the inclined surface 152d is formed is different from the reflectance of light in the other region.

The remaining structures are the same as the first embodiment. In the fan 10 of the present embodiment, the inclined surface 152d is formed in a part of the second end face portion 152. The inclined surface 152d is inclined with respect to the other portion. Thus, in the fan 10 of the present embodiment, the inclined surface 152d is formed in the one part of the annular region CR in the circumferential direction. The inclined surface 152d is inclined with respect to the other region.

Since the inclined surface 152d inclined with respect to the remaining parts is provided in the one part of the annular region CR, the refractive index is different therebetween. Accordingly, the rotational speed of the fan 10 can be detected accurately without an additional dedicated member or the like for differentiating the refractive index of light.

Here, in the present embodiment, the example in which the inclined surface 152d is formed in the step portion 152a located on the outer peripheral side of the second end face portion 152 has been described, but the present invention is not limited thereto. For example, an inclined surface may be formed in a boundary between the second end face portion 152 and the first end face portion 151. In this case, the first end face portion 151 may be exposed to the outside at the portion where the inclined surface is formed, and the second end face portion 152 may be exposed to the outside at the other portion other than the inclined surface.

Further, the configuration of the present embodiment can be obtained by forming an inclined surface in the end surface portion 15. Therefore, the configuration of the present embodiment is different from the first and second embodiments and can be applied to a fan 10 that is not constituted by an integrated mold product of the first end face portion 151 and the second end face portion 152, e.g. the end face portion 15 made of resin.

Fourth Embodiment

Next, a fourth embodiment will be described with reference to FIG. 13. This embodiment is different from the first embodiment in that the refractive index of light in the circumferential direction of the annular region CR is varied by the shape of the end face part 15. The end face portion 15 of this embodiment does not have the extension portion 152b described in the first embodiment.

Figure 13:
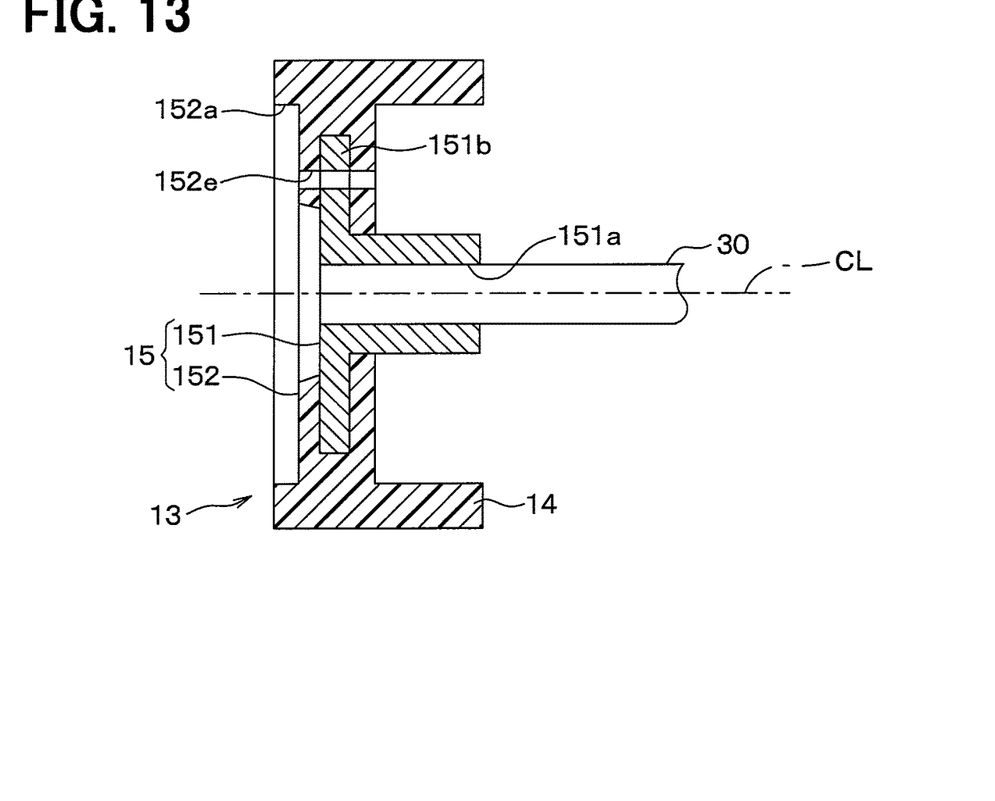
FIG. 13 is a schematic cross-sectional view illustrating a boss portion of a fan according to a fourth embodiment.

As shown in FIG. 13, in the present embodiment, a through hole 152e is formed in the second end face portion 152 so that a part of the second end face portion 152 in the circumferential direction has a recessed shape with respect to the other portion. Thereby, in the second end face portion 152, the portion where the through hole 152e is formed and the other portion have different refractive indices of light.

Although not shown in the drawings, in the present embodiment, the annular region irradiated with light from the light source of the rotational speed detection device 50 is set in a region including the through hole 152e of the end surface portion 15. As a result, in the annular region, the reflectance of the light in the region where the through hole 152e is formed in the circumferential direction is different from the reflectance of the light in the other region.

The remaining structures are the same as the first embodiment. In the fan 10 of the present embodiment, a through hole 152e is formed in a part of the second end face portion 152. As a result, the fan 10 of the present embodiment has a shape in which the one part of the annular region in the circumferential direction is irradiated with light is recessed with respect to the remaining parts.

Since the one part of the annular region has a shape different from the remaining parts of the annular region which is irradiated with light, the refractive index of light is different therebetween. Accordingly, the rotational speed of the fan 10 can be detected accurately without an additional dedicated member or the like for differentiating the refractive index of light.

Here, in the present embodiment, an example in which the through hole 152e is formed in a part of the second end face portion 152 has been described, but the present invention is not limited to this example. For example, a through hole may be formed in a part of the first end face portion 151.

Further, a slit-shaped groove may be provided instead of the through hole 152e in a part of the second end face portion 152 such that the one part in the circumferential direction in an annular region irradiated with light is recessed relative to the remaining parts.

Further, the configuration of the present embodiment can be obtained by forming a recess in the end surface portion 15. Therefore, the configuration of the present embodiment is different from the first and second embodiments and can be applied to a fan 10 that is not constituted by an integrated mold product of the first end face portion 151 and the second end face portion 152, e.g. the end face portion 15 made of resin.

Fifth Embodiment

Next, a fifth embodiment will be described with reference to FIG. 14. This embodiment is different from the first embodiment in that the refractive index of light in the circumferential direction of the annular region CR is varied by the shape of the end face part 15. The end face portion 15 of this embodiment does not have the extension portion 152b described in the first embodiment.

Figure 14:
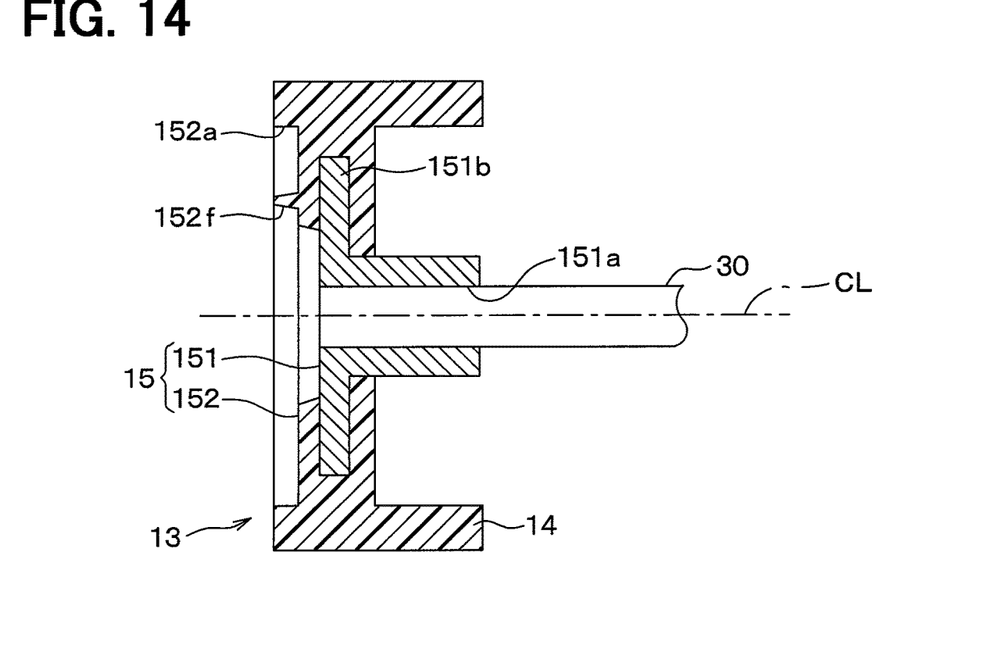
FIG. 14 is a schematic cross-sectional view illustrating a boss portion of a fan according to a fifth embodiment.

As shown in FIG. 14, in the present embodiment, a protrusion 152f is formed in the second end face portion 152 such that a part of the second end face portion 152 in the circumferential direction has a shape protruding with respect to the other part. Thereby, in the second end face portion 152, the portion where the protrusion 152f is formed and the other portion have different refractive indices of light.

Although not shown, in the present embodiment, the annular region irradiated with light from the light source of the rotational speed detection device 50 is set in a region including the protrusion 152f of the end surface portion 15. As a result, in the annular region, the reflectance of light in a part in the circumferential direction where the protrusion 152f is formed is different from the reflectance of light in the other part.

The remaining structures are the same as the first embodiment. In the fan 10 of the present embodiment, a protrusion 152f is formed in a part of the second end surface portion 152. Thus, in the fan 10 of the present embodiment, the one part of the annular region in the circumferential direction which is irradiated with light protrudes with respect to the remaining parts.

Since the one part of the annular region has a shape different from the remaining parts of the annular region which is irradiated with light, the refractive index of light is different therebetween. Accordingly, the rotational speed of the fan 10 can be detected accurately without an additional dedicated member or the like for differentiating the refractive index of light.

Here, in the present embodiment, an example in which the protrusion 152f is formed in a part of the second end face portion 152 has been described, but the present invention is not limited to this example. For example, a protrusion may be formed in a part of the first end face portion 151.

Further, the configuration of the present embodiment can be obtained by forming the protrusion 152f in the end surface portion 15. Therefore, the configuration of the present embodiment is different from the first and second embodiments and can be applied to a fan 10 that is not constituted by an integrated mold product of the first end face portion 151 and the second end face portion 152, e.g. the end face portion 15 made of resin.

Fifth Embodiment

Next, a sixth embodiment will be described with reference to FIG. 15. This embodiment is different from the first embodiment in that the refractive index of light in the circumferential direction of the annular region CR is varied by the surface roughness of the end face part 15. The end face portion 15 of this embodiment does not have the extension portion 152b described in the first embodiment.

Figure 15:
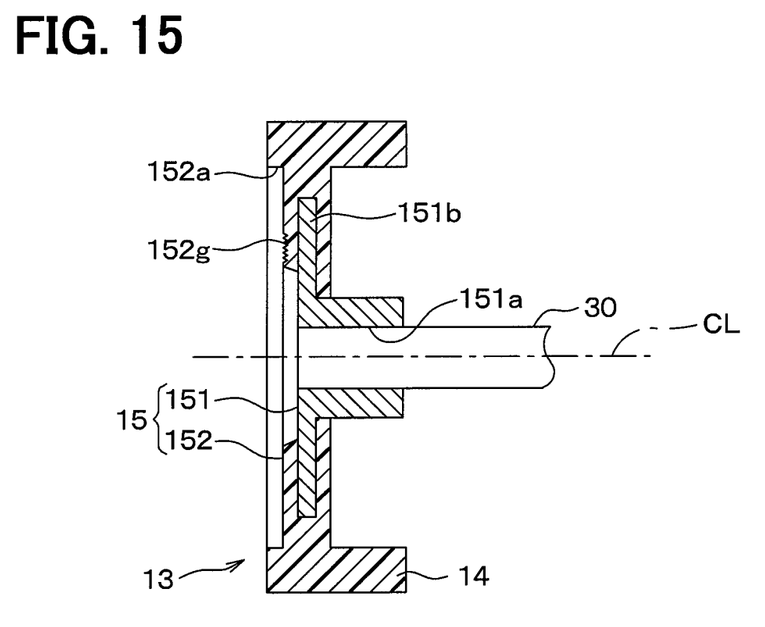
FIG. 15 is a schematic cross-sectional view illustrating a boss portion of a fan according to a sixth embodiment.

As shown in FIG. 15, in the present embodiment, a rough face portion 152g is formed in the second end face portion 152 such that a part of the second end face portion 152 in the circumferential direction is more rough than the other part. Thereby, in the second end face portion 152, the portion where the rough face portion 152g is formed and the other part have different refractive indices of light.

Although not shown, in the present embodiment, the annular region irradiated with light from the light source of the rotational speed detection device 50 is set in a region including the rough face portion 152g of the end surface portion 15. As a result, in the annular region, the reflectance of light in the region where the rough face portion 152g in the circumferential direction is formed is different from the reflectance of light in the other region.

The remaining structures are the same as the first embodiment. In the fan 10 of the present embodiment, the rough face portion 152g is formed in a part of the second end surface portion 152. Thus, in the fan 10 of the present embodiment, the one part of the annular region in the circumferential direction which is irradiated with light is more rough than the remaining parts.

Since the surface roughness of the one part of the annular region CR is different from the surface roughness of the remaining parts, the refractive index is different therebetween. Accordingly, the rotational speed of the fan 10 can be detected accurately without an additional dedicated member or the like for differentiating the refractive index of light.

Here, in the present embodiment, an example in which the rough face portion 152g is formed in a part of the second end face portion 152 has been described, but the present invention is not limited to this example. For example, a rough face portion may be formed in a part of the first end face portion 151.

Further, the configuration of the present embodiment can be obtained by forming the rough face portion 152g in the end surface portion 15. Therefore, the configuration of the present embodiment is different from the first and second embodiments and can be applied to a fan 10 that is not constituted by an integrated mold product of the first end face portion 151 and the second end face portion 152, e.g. the end face portion 15 made of resin.

In this embodiment, a part of the end face portion 15 is more rough than the other part. However, the present invention is not limited to this example. For example, the surface roughness of a part of the end face portion 15 may be smaller than the surface roughness of the other part.

Other Embodiments

Although the embodiments of the present disclosure have been described above, the present disclosure should not be limited to the above-described embodiments. For example, various modifications can be made as follows.

In each of the embodiments described above, an example in which the fan 10 of the present disclosure is applied to the blower 1 that blows air to the radiator has been described, but the present invention is not limited thereto. The fan 10 of the present disclosure is not limited to a fan of the blower 1 that blows air to the radiator, but can be applied to various devices having a fan that generates airflow.

In each of the above embodiments, there is described the example, in which the fan 10 of the present disclosure is an axial fan. However, the present disclosure should not be limited to this. The fan 10 of the present disclosure may be constituted by, for example, a centrifugal fan, a diagonal fan or the like.

It may be desirable to differentiate the refractive index of a part of the end face portion 15 by changing the constituent material, shape, and the like of the end face portion 15 of the fan 10 as in the above embodiments, but the invention is not limited thereto. For example, a polarizing seal, a polarizing paint or the like for changing the refractive index of light may be applied to a part of the end face portion 15 of the fan 10.

The constituent elements of each of the above embodiments are not necessarily essential unless it is specifically stated that the constituent elements are essential in the above embodiment, or unless the constituent elements are obviously essential in principle.

Furthermore, in each of the above embodiments, in the case where the number of the constituent elements, the value, the amount, the range, and/or the like is specified, the present disclosure is not necessarily limited to the number of the constituent elements, the value, the amount, and/or the like specified in the embodiment unless the number of the constituent elements, the value, the amount, and/or the like is indicated as indispensable or is obviously indispensable in view of the principle of the present disclosure.

Furthermore, in each of the above embodiments, in the case where the shape of the constituent elements and/or the positional relationship of the constituent elements are specified, the present disclosure is not necessarily limited to the shape of the constituent elements and/or the positional relationship of the constituent elements unless the embodiment specifically states that the shape of the constituent elements and/or the positional relationship of the constituent elements are necessary or are obviously essential in principle.

CONCLUSION

According to a first aspect described in some or all of the above-described embodiment, in an annular region concentric with the central axis of the rotation shaft, one part of the end face portion of the boss portion of the fan has a refractive index different from that of the remaining parts other than the one part in the circumferential direction.

According to a second aspect, the end face portion has a first end face portion and second end face portion. The first end face portion is made of metal and provided at a portion to which the rotation shaft is connected. The second end face portion made of resin constitutes a part of the first end face portion located on an outside in the radial direction of the rotation shaft. The first end face portion and the second end face portion are integrally molded as a single member.

According to this, since the strength of the connecting portion of the boss portion connected to the rotating shaft can be secured, the rotation of the boss portion can be sufficiently stabilized. This is advantageous for appropriately detecting the rotational speed of the fan.

According to a third aspect, in the fan, one of the first end face portion and the second end face portion is exposed to the outside at the one part, and the other of the first end face portion and the second end face portion is exposed to the outside at the remaining parts. Since the constituent material of the one part is different from the constituent material of the remaining part, the refractive index is different therebetween. Accordingly, the rotational speed of the fan can be detected accurately without an additional dedicated member or the like for differentiating the refractive index of light.

According to a fourth aspect, in the fan, the one part corresponds to a part in which the second end face portion exposed to the outside, and the remaining parts correspond to a part in which the first end portion is exposed to the outside. According to this, the rotational speed of the fan can be detected accurately without an additional dedicated member for changing the refractive index of light.

According to a fifth aspect, the one part has a recessed shape or a protruding shape with respect to the remaining parts. Since the one part is different in shape from the remaining parts, the refractive index is different therebetween. Accordingly, the rotational speed of the fan can be detected accurately without an additional dedicated member or the like for differentiating the refractive index of light.

According to a sixth aspect, the inclined surface inclined with respect to the remaining parts is provided in the one part. Since the inclined surface inclined with respect to the remaining parts is provided in the one part, the refractive index is different therebetween. Accordingly, the rotational speed of the fan can be detected accurately without an additional dedicated member or the like for differentiating the refractive index of light.

According to a seventh aspect, the surface roughness of the one part is different from the surface roughness of the remaining parts. Since the surface roughness of the one part is different from the surface roughness of the remaining pars, the rotational speed of the fan can be detected accurately without an additional dedicated member or the like for differentiating the refractive index of light.

According to an eighth aspect, the fan is applied to a rotation detecting device that detects the rotational speed based on a change in reflectance of light irradiated from a light source. In this case, the one part is intermittently irradiated with light from the light source when the rotation axis rotates. According to this, since the rotational speed of the fan is detected by utilizing the change of the reflected light when the boss portion that rotates stably compared to the blade is irradiated with light, the rotation speed of the fan can be appropriately detected.

According to a first aspect described in some or all of the above-described embodiment, in an annular region concentric with the central axis of the rotation shaft, the one part of the end face portion of the boss portion of the fan has a refractive index different from that of the remaining parts in the annular region in the circumferential direction. Also, light is irradiated onto a track of the one region circling around the central axis of the rotating shaft when the fan rotates. Then, the rotational speed of the fan is detected based on the change in the reflectance of the reflected light from the end surface portion.

What is claimed is:

1. A fan system comprising: a fan configured to generate an air flow by rotating together with a rotation shaft, the fan comprising:
    a plurality of blades arranged radially about a central axis of the rotation shaft; and
    a boss portion that connects the plurality of blades to the rotation shaft, wherein
    the boss portion includes an end face portion located on one end side of the rotation shaft,
    the end face portion has an annular region concentric with the central axis of the rotation shaft, and
    one part of the annular region in a circumferential direction has an optical refractive index different from an optical refractive index of another part of the annular region in the circumferential direction; and
    a light emitting element configured to irradiate a light on the annular region of the end face portion; and
    a light receiving element configured to detect a change of reflectance of the light irradiated onto the end face portion; and
    a rotational speed detection unit configured to detect a rotational speed of the fan with reference to the change of reflectance of the light.

2. The fan system according to claim 1, wherein
    the end face portion includes
    a first end face portion made of metal and located in a part connected to the rotation shaft, and
    a second end face portion made of resin and constituting a part located outside of the first end face portion in a radial direction of the rotation shaft, and
    the first end face portion and the second end face portion are provided as a single component.

3. The fan system according to claim 2, wherein
    one of the first end portion and the second end portion is exposed to an outside at the one part, and
    another of the first end portion and the second end portion is exposed to the outside at the another part.

4. The fan system according to claim 3, wherein
    a part of the second end face portion is exposed to the outside at the one part, and
    a part of the first end face portion is exposed to the outside at the another part.

5. The fan system according to claim 1, wherein
    the one part has a shape recessed or protruding with respect to the another part.

6. The fan system according to claim 1, wherein
    an inclined surface inclined with respect to the another part is provided in the one part.

7. The fan system according to claim 1, wherein
    the one part is different in surface roughness than the another part.

8. The fan system according to claim 1, wherein
    the one part is intermittently irradiated with the light from the light emitting element when the rotation shaft is rotated.

9. A method for detecting a rotational speed of a fan that includes
    a plurality of blades arranged radially about a central axis of a rotation shaft, and
    a boss portion that connects the plurality of blades to the rotation shaft,
    the method comprising:
    configuring an annular region of an end face portion of the boss portion concentric with the central axis of the rotation shaft such that one part of the annular region in a circumferential direction has an optical refractive index different from an optical refractive index of another part of the annular region in the circumferential direction;
    irradiating, with light, a track of the one part rotating about the central axis of the rotation shaft during rotation of the fan; and
    detecting the rotational speed of the fan with reference to a change of reflectance of light reflected by the end face portion.

* * * * *